US010619934B2

(12) United States Patent
Honnorat et al.

(10) Patent No.: US 10,619,934 B2
(45) Date of Patent: Apr. 14, 2020

(54) PLATE HEAT EXCHANGER COMPRISING STRUCTURAL REINFORCEMENTS FOR A TURBINE ENGINE

(71) Applicant: AIRBUS HELICOPTERS, Marignane (FR)

(72) Inventors: Olivier Honnorat, Aix en Provence (FR); Christophe Dubourg, Le Tholonet (FR)

(73) Assignee: Airbus Helicopters, Marignane (FR)

(*) Notice: Subject to any disclaimer, the term of this patent is extended or adjusted under 35 U.S.C. 154(b) by 481 days.

(21) Appl. No.: 15/318,596

(22) PCT Filed: Jun. 16, 2015

(86) PCT No.: PCT/EP2015/063401
§ 371 (c)(1),
(2) Date: Dec. 13, 2016

(87) PCT Pub. No.: WO2016/012161
PCT Pub. Date: Jan. 28, 2016

(65) Prior Publication Data
US 2017/0131035 A1 May 11, 2017

(30) Foreign Application Priority Data

Jul. 25, 2014 (FR) .................................... 14 01715

(51) Int. Cl.
*F28D 1/00* (2006.01)
*F28D 9/00* (2006.01)
(Continued)

(52) U.S. Cl.
CPC .......... *F28D 9/0043* (2013.01); *B64D 27/10* (2013.01); *B64D 33/02* (2013.01); *F02C 7/14* (2013.01);
(Continued)

(58) Field of Classification Search
CPC ...... F02C 7/14; F02C 7/08; F02C 1/04; F02C 1/06; F28D 9/0043; F28D 9/0006;
(Continued)

(56) References Cited

U.S. PATENT DOCUMENTS 5,086,837 A * 2/1992 Hagemeister ......... F28D 9/0043
165/167
5,184,673 A * 2/1993 Hedman .............. B23K 1/0012
165/153

(Continued)

FOREIGN PATENT DOCUMENTS

DE 2943010 5/1980
DE 1407080 9/1994

(Continued)

OTHER PUBLICATIONS

International Search Report for PCT/EP2015/063401, English translation attached to original, both completed by the European Patent Office dated Feb. 3, 2016, 9 Pages.

*Primary Examiner* — Craig Kim
*Assistant Examiner* — Edwin Kang
(74) *Attorney, Agent, or Firm* — Brooks Kushman P.C.

(57) ABSTRACT

A plate heat exchanger comprising a plurality of plates having a plane peripheral zone, an inner zone having sinusoidal undulations and two chimneys positioned at two opposite corners of the plates. Modules are formed by assembling two plates that make contact via the undulation troughs and the peripheral zones. The modules are stacked so as to make contact via the inlet and outlet chimneys. Each module may thus deform independently, in particular at the undulation troughs and ridges without transmitting stress to the other modules of the heat exchanger. In addition, the heat (Continued)

exchanger may comprise a tie rod in each inlet and outlet pipe so as to withstand the static pressure of the fluids flowing in the pipes.

17 Claims, 7 Drawing Sheets

(51) Int. Cl.
  *F28F 9/02* (2006.01)
  *F02C 7/14* (2006.01)
  *F02K 3/115* (2006.01)
  *B64D 27/10* (2006.01)
  *B64D 33/02* (2006.01)
  *F28D 21/00* (2006.01)

(52) U.S. Cl.
  CPC ............ *F02K 3/115* (2013.01); *F28D 9/0006* (2013.01); *F28F 9/0273* (2013.01); *F05D 2260/213* (2013.01); *F28D 2021/0026* (2013.01); *F28F 2225/08* (2013.01); *F28F 2265/26* (2013.01); *Y02T 50/675* (2013.01)

(58) Field of Classification Search
  CPC .......... F28D 2021/0026; F28F 2225/08; F28F 2265/26; F28F 2225/02; F28F 2275/205
  See application file for complete search history.

(56) References Cited

U.S. PATENT DOCUMENTS

| | | |
|---|---|---|
| 5,400,854 A | 3/1995 | Iio et al. |
| 6,016,865 A | 1/2000 | Blomgren |
| 6,681,844 B1* | 1/2004 | Inoue .................. F28D 5/02 |
| | | 165/115 |
| 2002/0174978 A1* | 11/2002 | Beddome ............ F28D 9/0043 |
| | | 165/174 |
| 2011/0024082 A1* | 2/2011 | Bhame ................ F28D 9/0012 |
| | | 165/95 |
| 2011/0146226 A1* | 6/2011 | Wood .................... F02C 7/10 |
| | | 60/39.511 |
| 2013/0287379 A1* | 10/2013 | Yoshitomi ............ F24H 9/146 |
| | | 392/486 |

FOREIGN PATENT DOCUMENTS

| | | |
|---|---|---|
| EP | 1122505 | 8/2001 |
| EP | 2336698 | 6/2011 |
| FR | 2280870 | 2/1976 |
| FR | 2988822 | 10/2013 |
| GB | 1479074 | 7/1977 |
| WO | 2010132302 | 11/2010 |

* cited by examiner

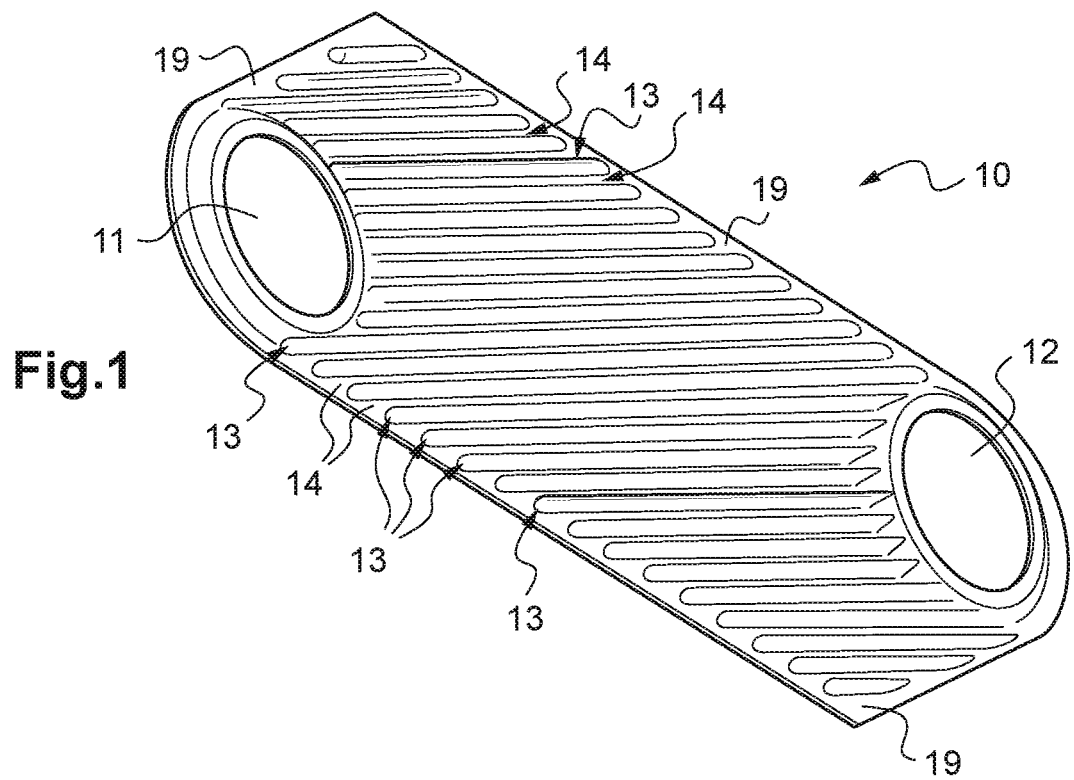
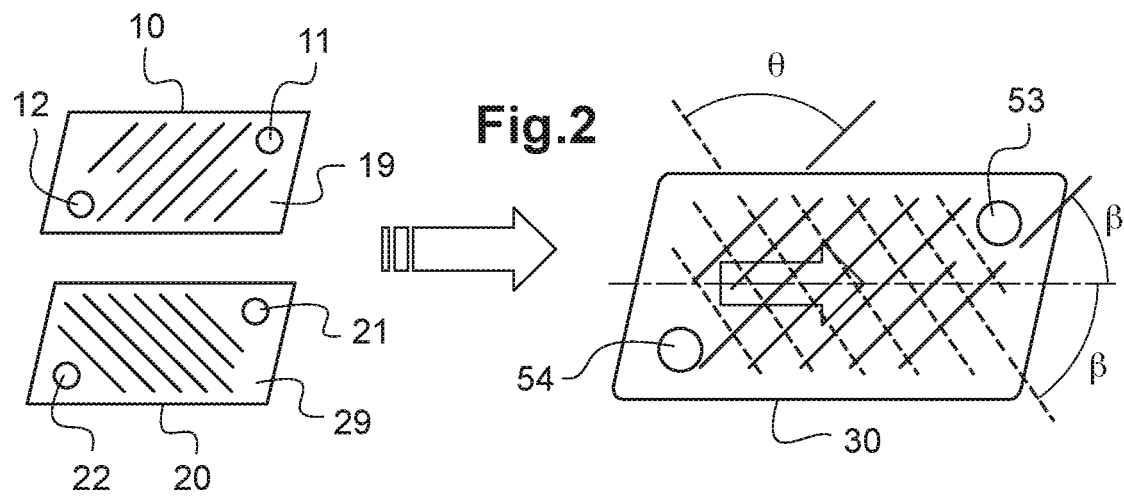

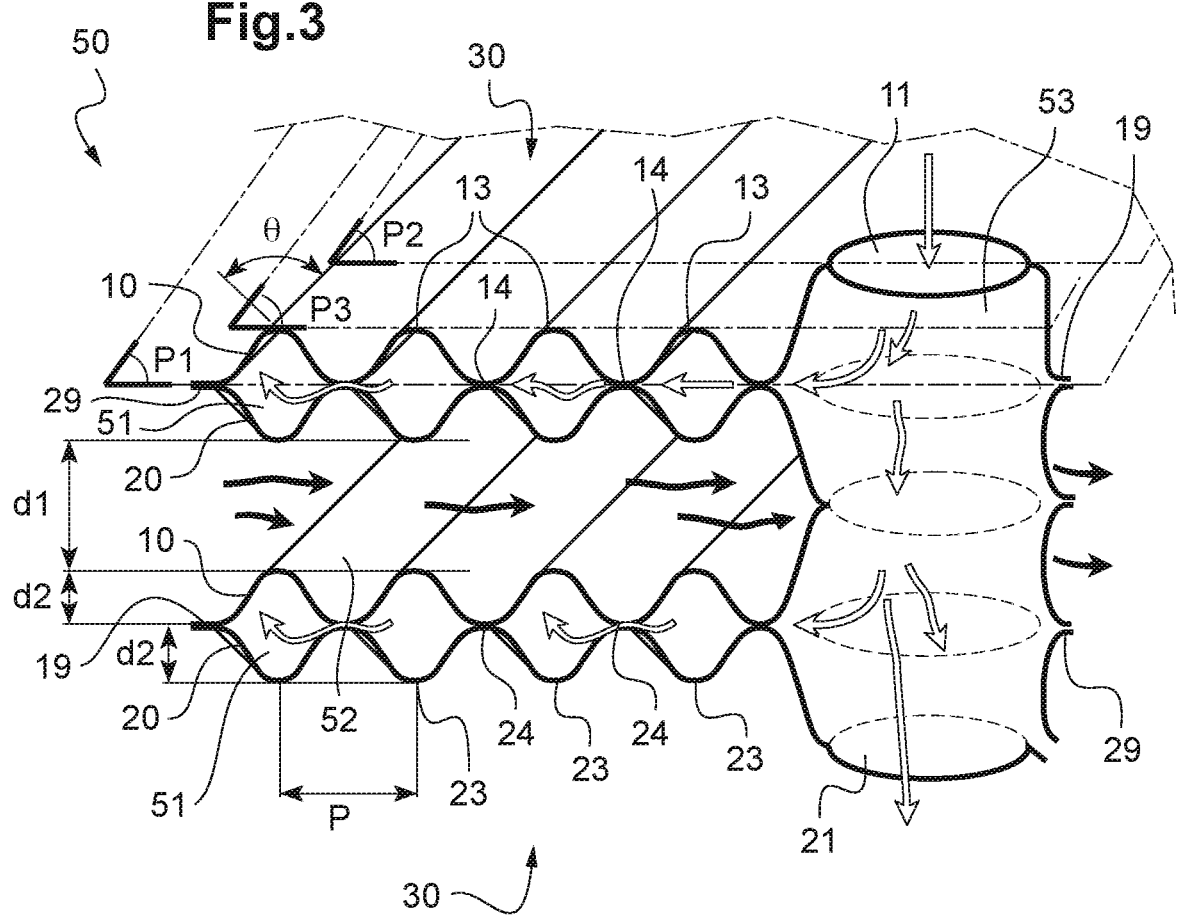
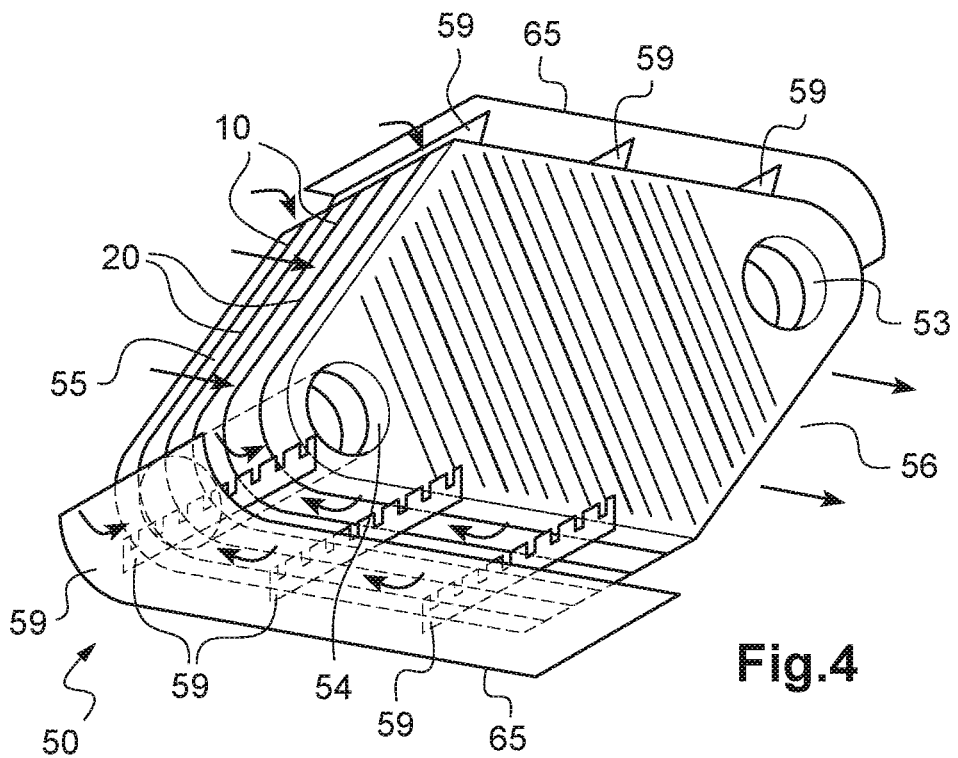

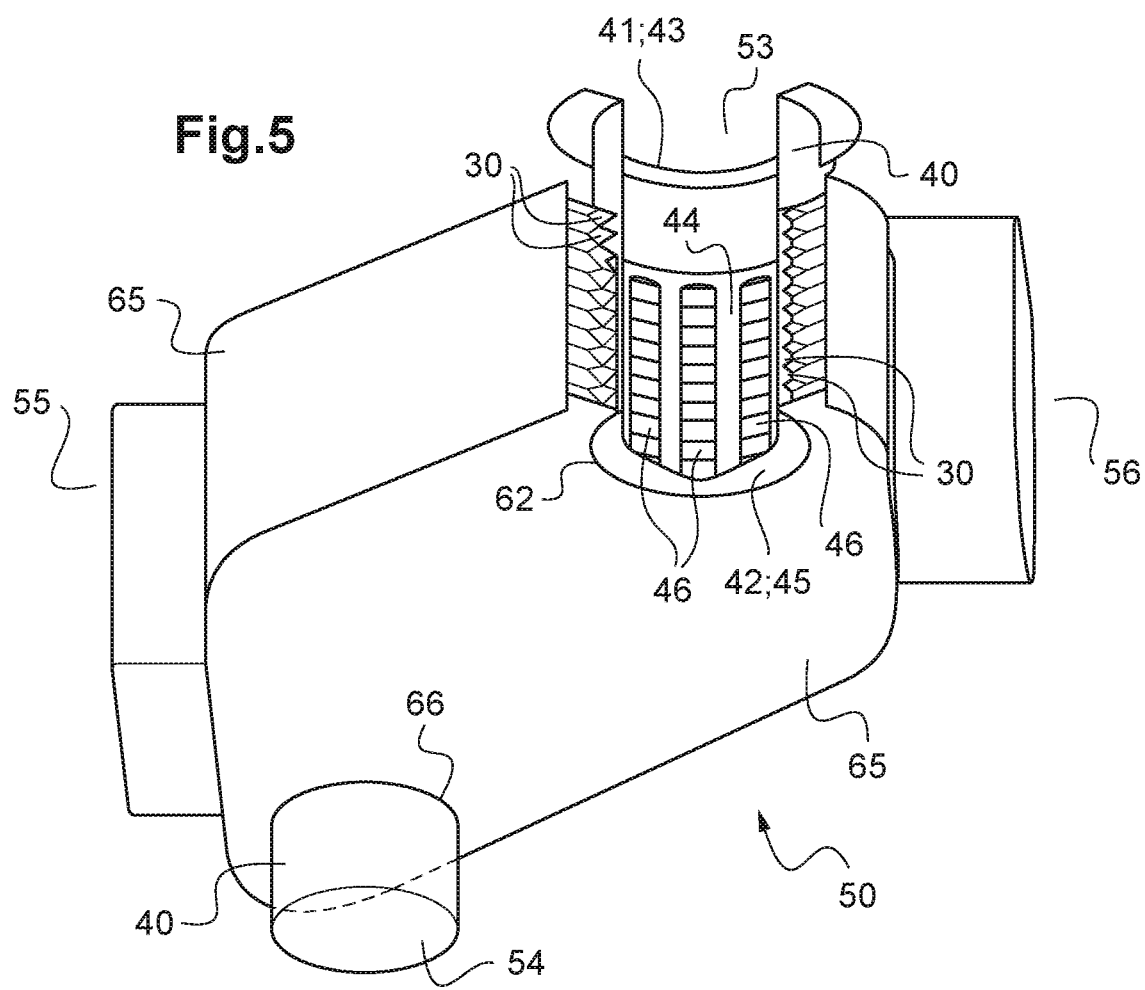

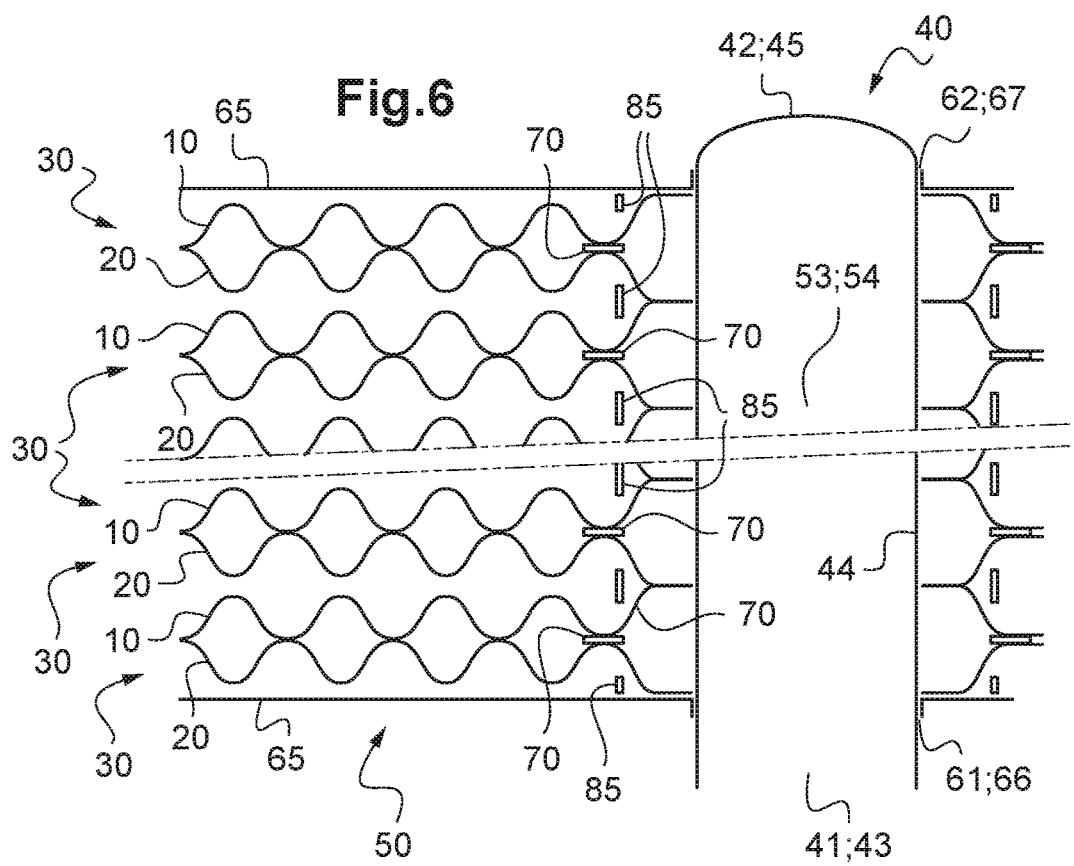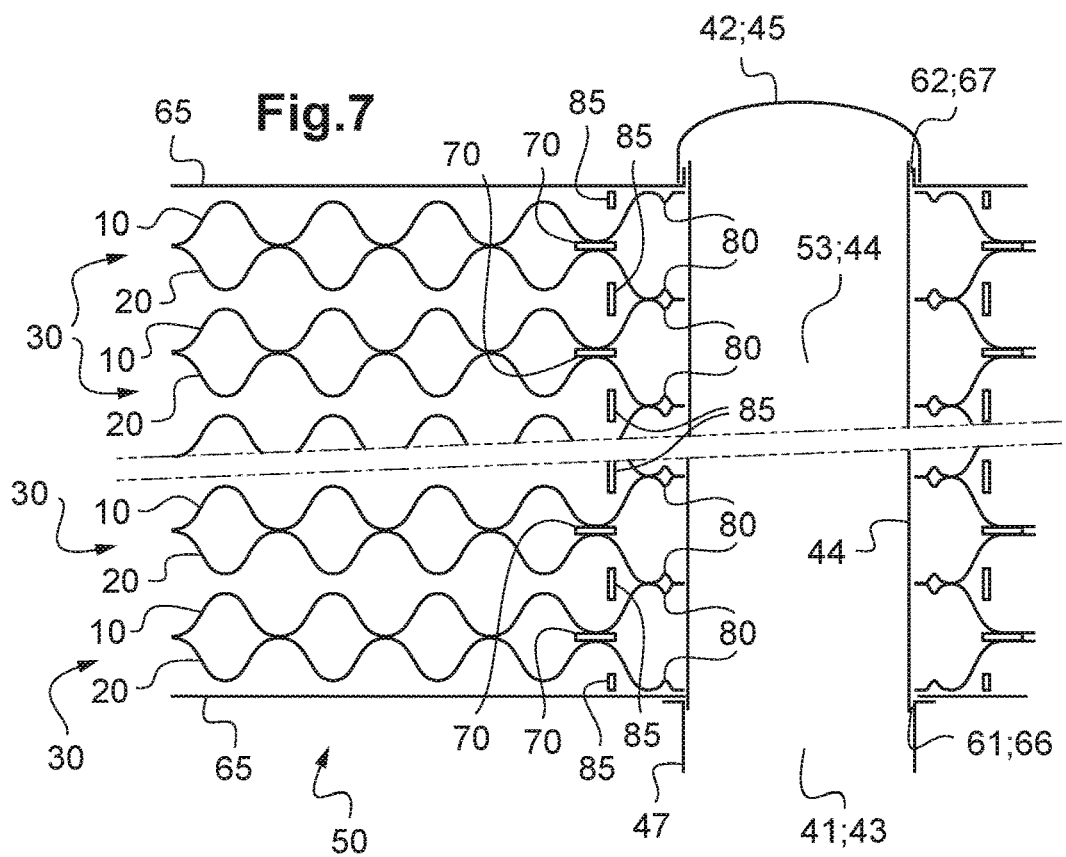

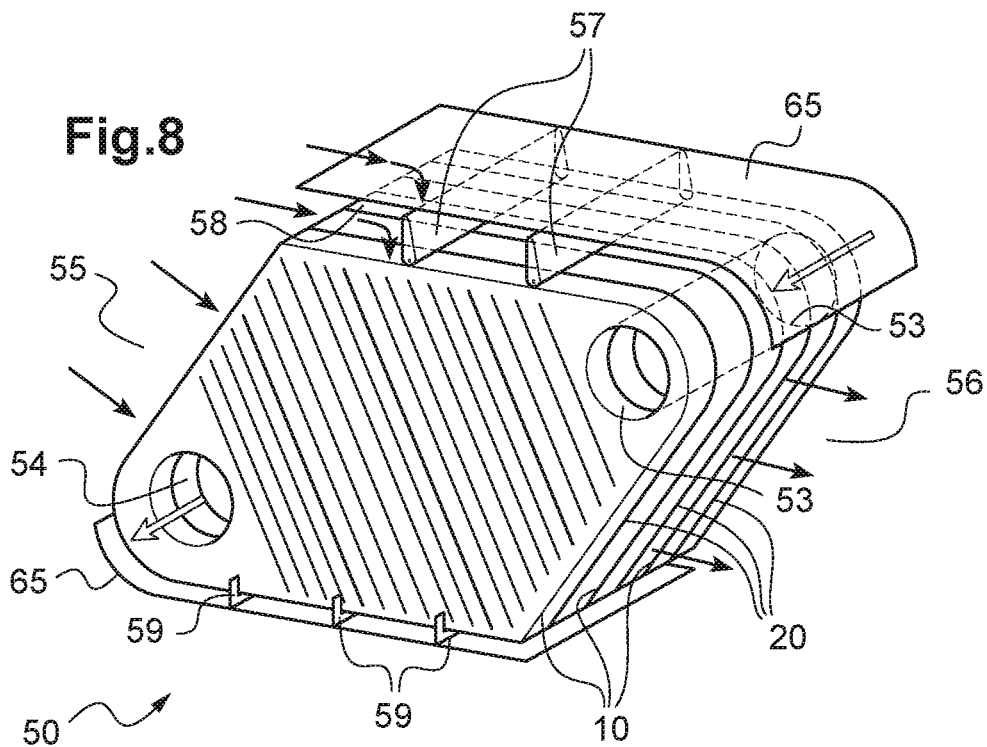
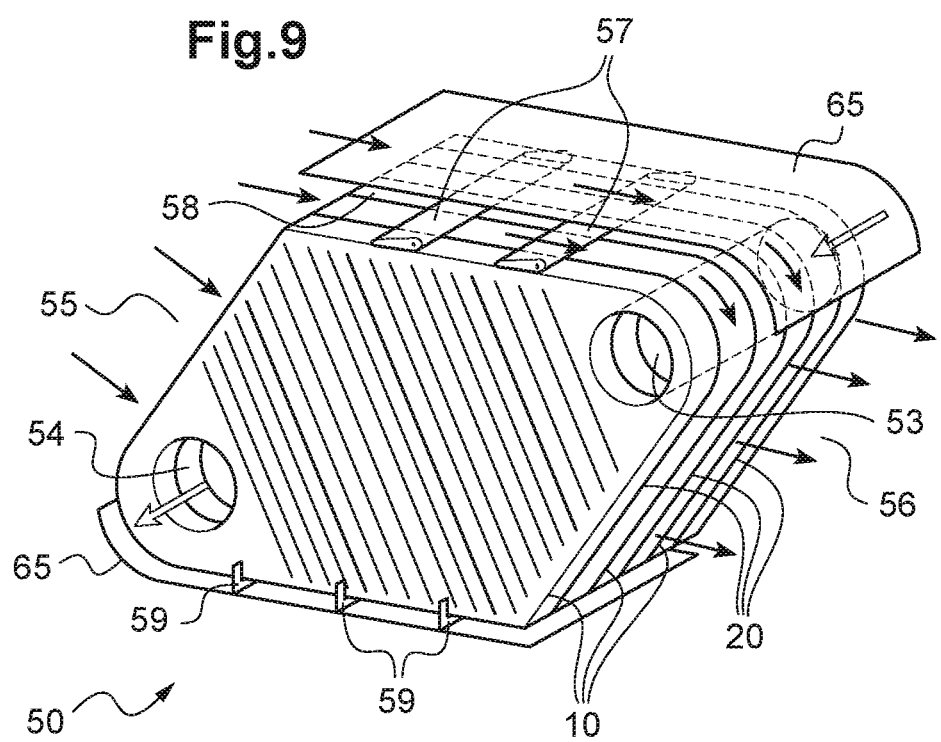

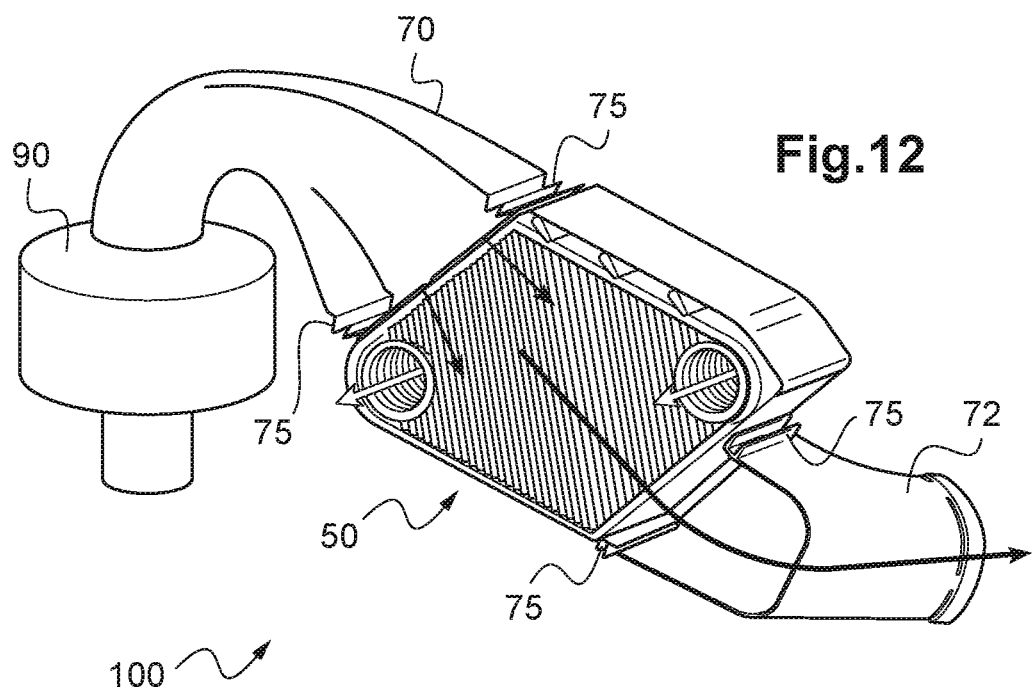
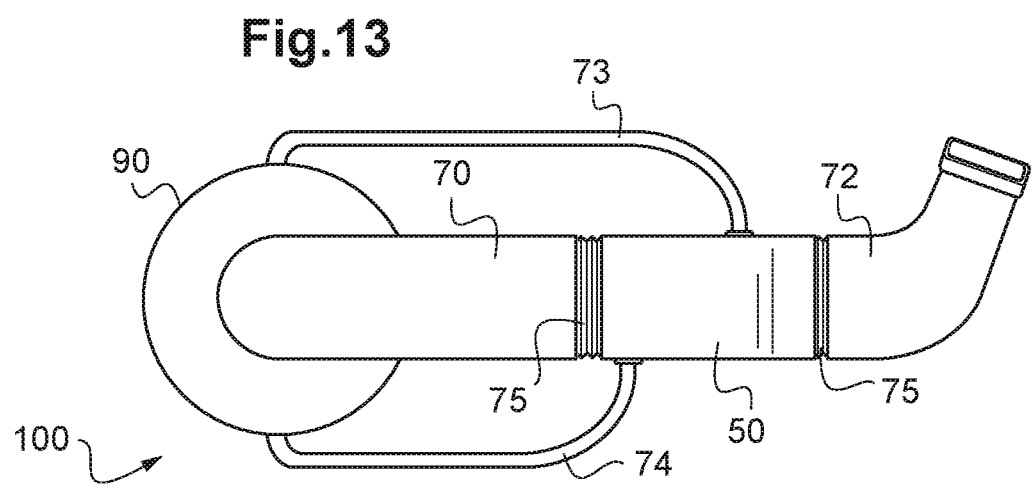

PLATE HEAT EXCHANGER COMPRISING STRUCTURAL REINFORCEMENTS FOR A TURBINE ENGINE

CROSS REFERENCE TO RELATED APPLICATIONS

This application is the U.S. National Phase of PCT Appln. No. PCT/EP2015/063401 filed Jun. 16, 2015, which claims priority to French patent Appln. No. 14 01715 filed Jul. 25, 2014, the disclosures of which are incorporated in their entirety by reference herein.

BACKGROUND OF THE INVENTION

(1) Field of the Invention

The present invention lies in the field of heat exchangers. The invention relates to a plate heat exchanger with structural reinforcement in which two fluids flow preferably as counter-flows. The heat exchanger is particularly intended for heating admission air to a gas turbine of an aircraft. The invention also relates to a gas turbine fitted with the heat exchanger and to a rotary wing aircraft, such as a helicopter, powered by one or more such gas turbines.

(2) Description of Related Art

It is known that the efficiency of gas turbines is relatively low. In particular with turboshaft engines, the particular type of gas turbine engines conventionally used for rotary wing aircraft, this efficiency is of the order of 25%.

One known solution for improving efficiency is to heat the air after it has been compressed and before it is admitted into the combustion chamber of the turboshaft engine. This makes it possible to reduce the requirement for heat in the combustion chamber, and consequently to reduce the fuel consumption of the engine.

The admission air may be heated in particular by using the heat of the exhaust gas leaving the turbine, this heat generally being unused. For this purpose, appropriate heat exchangers are used in particular in industrial power plants.

However, applying such heat exchangers to the specific field of aircraft turboshaft engines encounters several major problems, in particular the weight and the volume of such heat exchangers and the loss of power of the engine using such a heat exchanger.

The exhaust gas leaves the turbine at high speed, and causing it to flow through a heat exchanger that recovers a portion of its heat leads to significant head losses in the flow of the exhaust gas, thereby leading to a loss of engine power.

Furthermore, the volume available in an aircraft is small, so installing a heat exchanger on an engine leads to problems of bulk. Finally, weight is also an important criterion that affects the performance of the aircraft.

Document FR 2 280 870 describes a heat exchanger for which the two fluids flow as counter-flows. That heat exchanger is made of metal plates, e.g. aluminum plates, having regular undulations. The undulations are mutually parallel and perpendicular to the flows of the two fluids.

The two cavities constituted by those plates have the same volume, with the spacing between the plates being constant and ensured by spacers and by bulges on each plate. Sealing between the plates is obtained by using synthetic plastics material, with the plates being fastened together by crimping.

Document U.S. Pat. No. 6,016,865 discloses a plate heat exchanger for exchanging heat between a first fluid at a high pressure and at a low flow rate and a second fluid at a low pressure and at a high flow rate. Each plate has projecting and set-back shapes forming V-shapes that are inclined relative to the flows of the fluids. Those shapes are also inclined relative to each other on two adjacent plates.

The plates are assembled together in pairs by welding or brazing, for example, at their peripheral zones and at the points of contact between the set-back shapes in order to form modules. The modules are then stacked on one another, making contact via bulges. Thus, the fluids may flow in two independent volumes, allowing heat to be exchanged between them.

Furthermore, Document EP 1 122 505 describes a plate heat exchanger in which the plates are grouped together in pairs are and positioned in a casing. Furthermore, each plate has a plurality of chimneys, and once the chimneys are grouped together, they form inlet pipes and outlet pipes for the heat exchanger.

Document FR 2 988 822 is also known, which describes a heat exchanger having a plurality of plates. Each plate has a multitude of parallel sinusoidal undulations of different heights, and each plate has two chimneys. The plates are associated in pairs, making contact via the undulations of smaller height, and the modules formed by these pairs of plates come into contact via the undulations of greater height. The various undulations contribute to stirring the fluids, thus improving heat exchange between them. The plates of that heat exchanger are of small thickness and made of Inconel®.

In addition, document WO2010/132302 describes a heat exchanger comprising a core provided with a plurality of stacked plates, a core control assembly, and a housing in which the core is positioned. The plates have troughs and ridges and they are associated in pairs by making contact via said ridges. The control means comprises a plurality of threaded tie rod portions connected in pairs by a nut making it possible to adjust clamping of the plates.

Finally, Document US2002/174978 is known, which describes a heat exchanger having a plurality of stacked plates, an air intake, and an air outlet. A tube provided with openings on its circumference is positioned in the air intake and the air outlet and the air entering and leaving the heat exchanger both pass therethrough. That tube thus makes it possible to improve the rigidity of the heat exchanger and in particular to absorb the mechanical stress generated by the thermal expansion of its various components as well as by the pressure of the air entering the heat exchanger.

Those various plate heat exchangers are usable in an engine, since their volumes and their weights are of reasonable proportions. Nevertheless, they are not suitable for satisfying all of the constraints generated by a turboshaft engine of a rotary wing aircraft.

Apart from the above-mentioned constraints concerning volume and weight, the exhaust gas from a turboshaft engine is extremely hot, having a temperature of about 700° degrees Celsius (° C.). As a result, the elements constituting the heat exchanger must be capable of withstanding such temperatures. Furthermore, on starting the engine, the rise in temperature is very large and fast, with temperature going from about 15° C. to about 700° C. within about ten seconds inside the heat exchanger, and in particular in each module constituted by two associated plates.

Each module deforms following very considerable heat expansion and, since the modules of the heat exchanger are connected to one another, it can generate mechanical stress on the other modules of the heat exchanger. This leads to a considerable increase in the mechanical stresses on each module, accompanied by deformation of the heat exchanger in general and in particular by a large amount of deformation in the two extreme modules of the heat exchanger.

Furthermore, the temperature difference between the exhaust gas and the admission air is large, being of the order of 300° C., and possibly closer to 600° C. when the engine is starting. Likewise, the pressure difference between the two fluids is large, with the exhaust gas leaving the turbine at atmospheric pressure, whereas the admission air enters the heat exchanger at a pressure lying in the range 6 bars to 11 bars.

These differences of pressure and temperature between the two fluids give rise to additional thermal and mechanical stresses in the heat exchanger. These stresses may give rise in particular to deformations and/or cracks in the components of the heat exchanger and also to cracking or breaking in the welds. Consequently, the sealing of the heat exchanger modules may deteriorate, with leaks appearing between the modules.

More particularly, the admission air flowing in the heat exchanger at a high pressure creates very considerable thrust on the two extreme modules of the heat exchanger. The admission air generates localized thrust zones on the two walls blocking the inlet and outlet pipes, said two walls being opposite the inlet and outlet of the respective pipes. A large amount of deformation thus appears on each extreme module that may lead to it being damaged. The term "extreme module" is used to designate the first or the last module in the stack of modules of the heat exchanger.

Solutions exist for reinforcing said extreme modules, such as the addition of stiffeners (indentations) or also reinforcing flanges (separate fittings). Those solutions do not reduce the thrust to which the extreme modules are subjected: they only limit the consequences of said thrust. Consequently, each extreme module continues to be subjected to deformation, which is indeed reduced, but which will end up causing cracks and leaks, or even breaks, to appear in said extreme module and/or its welds. Consequently, the lifetime of the heat exchanger is shortened.

Finally, in order to have good thermal efficiency for the heat exchanger, i.e. large capacity for transmitting heat from the exhaust gas to the admission air, the fluids must flow over a large heat exchange area that exchanges heat well. Consequently, there needs to be a large amount of thermal convection between the two fluids.

Stirring the fluids leads to an increase in convection between the fluids and consequently also enables heat exchange to be improved. However, such stirring causes the fluids to flow in turbulent manner, thereby giving rise to head losses that may be large. The head losses of the fluids flowing through the heat exchanger and the heat exchange coefficients between the fluids are thus directly related.

In addition, head losses in a fluid are proportional, to the first order, to the square of the speed of the fluid. Thus, since admission air is flowing at a low speed, the head losses to which it is subjected are very small. In contrast, the head losses in the exhaust gas are particularly great, since the gas leaves the turbine at high speed. These head losses then give rise to the engine losing power, and that is harmful in certain particular stages of flight, such as stages of takeoff, landing, and hovering.

BRIEF SUMMARY OF THE INVENTION

An object of the present invention is thus to provide a plate heat exchanger making it possible to be unaffected by the above-mentioned limitations and more particularly to improve the lifetime of said heat exchanger by reducing the mechanical and thermal stresses to which the heat exchanger modules are subjected.

According to the invention, a heat exchanger has a plurality of modules, each made up of two metal plates. Each plate has a peripheral zone, at least one inlet chimney, at least one outlet chimney, and a crenellated inner zone made up of ridges and troughs.

The peripheral zone is preferably plane and then forms a lower plane P1 in which the bottoms of the troughs are located. Each inlet chimney and each outlet chimney rises from the peripheral zone to an upper plane P2 parallel to the lower plane P1.

The plates are assembled in pairs to form modules. The two plates of a pair come into contact firstly via their peripheral zones and secondly at the points of contact between the troughs. The two plates are fastened together firstly at their points of contact in their peripheral zones and secondly at at least one point of contact between their troughs.

By way of example, the two plates may be fastened together by welding or preferably by brazing.

The heat exchanger of the invention is formed by stacking a plurality of modules. In such a heat exchanger, the directions of the troughs and of the ridges on each plate lie at a first angle $\beta$ relative to the flow direction of the fluids through the heat exchanger, and the directions of the troughs and of the ridges of two adjacent plates form a non-zero second angle $\theta$ relative to each other.

An inlet pipe of the heat exchanger is formed by assembling together one of the inlet chimneys of each of the plates constituting the module. Likewise, an outlet pipe is formed by assembling together one of the outlet chimneys of each of the plates.

The heat exchanger thus has one or more inlet pipes and one or more outlet pipes. The heat exchanger has as many inlet pipes as the plates constituting the modules have inlet chimneys and as many outlet pipes as the plates have outlet chimneys.

The heat exchanger of the invention also has a casing in which the modules are housed, the casing having a plurality of walls.

Two additional openings are arranged in the casing to form an inlet and an outlet of the heat exchanger.

A first cavity is constituted by the inside space of a module, i.e. by the space between the two plates of the module. A first fluid then flows throughout all of the first cavities in the modules of the heat exchanger and between each inlet pipe and each outlet pipe.

A second cavity is constituted mainly by the space between two adjacent modules and also by the space between each extreme module and a wall of the casing. A second fluid then flows throughout the second cavities of the modules of the heat exchanger between the inlet and the outlet of the heat exchanger.

The second fluid may thus flow parallel to the first fluid and preferably in the opposite direction to the first fluid. Such a heat exchanger is known as a counter-flow heat exchanger.

Nevertheless, the second fluid may also flow parallel with and in the same direction as the first fluid: this constitutes a parallel flow heat exchanger.

A third cavity is constituted by the space situated between the peripheral zones of the modules and the walls of the casing. The second fluid may also flow in this third cavity.

The device is remarkable in that the modules are stacked in such a manner that two adjacent modules make contact via said inlet and outlet chimneys, with a first non-zero distance separating the ridges of said two adjacent plates from two adjacent modules. For this purpose, the ridges of each plate are situated in an intermediate plane P3 that is parallel to the lower and upper planes and that is positioned between said two planes.

Two adjacent modules are fastened to the inlet and outlet chimneys, e.g. by welding, or preferably by brazing. Likewise, each extreme module of the stack of modules is fastened to a wall via each inlet chimney and each outlet chimney by welding, or preferably by brazing.

A plurality of modules are stacked to form the heat exchanger forming the subject matter of the invention. The heat exchanger thus includes a plurality of first cavities and a plurality of second cavities.

The first cavities are connected together by means of each inlet pipe formed by the inlet chimneys of each plate and by means of each outlet pipe formed by the outlet chimneys of each plate. One end of each inlet and outlet pipe leads to the outside of the heat exchanger via the walls of the casing, respectively for entry and exit of the first fluid flowing in the first cavities.

The second cavities are connected together in particular via the inlet and the outlet of the heat exchanger and also via the space at the periphery of each plate constituting the third cavity. The flow of the second fluid is limited by the walls of the casing.

In this manner, heat exchanges between the two fluids flowing in the first and second cavities take place through the plates, the two fluids flowing along the same axes on opposite sides of the plates, and preferably in opposite directions.

However, no exchange of heat between the fluids takes place when the second fluid flows in the third cavity. At least one portion of this third cavity may include a plurality of combs making it possible to guide the second fluid towards the second cavities. A fluid is naturally directed towards the space facilitating its flow, i.e. where head losses are smallest. The second fluid would therefore naturally and essentially be directed towards the third cavity if it did not include said combs.

These combs thus occupy the full height of the third cavity, between the walls of the casing and the modules, so as to constitute obstacles for the second fluid and to guide it towards the second cavities.

By means of their particular shape, these combs may also be positioned between the modules, at the peripheries of the plates, thus guaranteeing spacing between said modules.

In order for the module of the heat exchanger to be uniform, in particular in terms of material and of thermal expansion in particular, the combs are made of a material that is similar to that of the plates constituting said heat exchanger. Preferably, the combs are made of the same material as said plates.

Advantageously, the modules forming the heat exchanger of the invention are in contact with the inlet and outlet chimneys as well as possibly with the combs present between the walls and the modules. Consequently, the mechanical and thermal behavior of each module is independent from the other modules.

Each module may thus be subjected to large amounts of deformation firstly due to thermal expansion following considerable differences in temperature between the first and second fluids and secondly due to considerable pressure of the first fluid and/or to a considerable difference in pressure between the first and second fluids.

This deformation of a module takes place essentially at the troughs and ridges. As a result, since the troughs and the ridges of a module are not in contact with the adjacent modules or with the casing of the heat exchanger, this deformation does not spread to the other modules, nor to the casing, and therefore does not generate any stress on the adjacent modules or on the casing.

Thus, the heat exchanger of the invention makes it possible for each module to deform freely so as to absorb the thermal and mechanical stresses to which is it subjected. In this manner, this heat exchanger makes it possible to improve the lifetime of each module in terms of thermal and pressure cycles and, consequently to improve the lifetime of the entire heat exchanger.

Consequently, the heat exchanger of the invention is particularly adapted to a first fluid at a pressure that is considerable and/or that is noticeably greater than the pressure of the second fluid. In addition, this heat exchanger is also adapted to be subjected to considerable temperature differences between the first and second fluids when they enter into the heat exchanger.

Advantageously, this improvement in the lifetime of the heat exchanger is obtained without adding stiffening or reinforcing components, i.e. without increasing the weight of the heat exchanger.

In addition, the troughs and the ridges of the plates can take on a variety of shapes as are conventionally used in a heat exchanger. These various shapes may in particular be imposed by the material from which the plates are made and by any constraint involved with shaping these plates and also with optimizing exchanges of heat between the first and second fluids.

By way of example, the troughs and the ridges in the plates may be in the form of rectangular section waves or trapezoidal section waves. The ridges and the troughs may also be sinusoidal undulations.

Furthermore, the troughs and the ridges in a plate may all be in a single direction such as a straight line over the entire plate. By way of example, the troughs and the ridges may be directed in parallel directions.

In contrast, the troughs and the ridges in a plate may follow directions that intersect over the entire plate. For example, the troughs and the ridges may have two intersecting directions thus forming V-shapes, i.e. each trough and each ridge in a plate is constituted by two lines forming a V-shape, with these two lines forming a generally acute angle between each other.

Naturally, other shapes may be envisaged for the troughs and the ridges in the plates. Nevertheless, these shapes must be compatible with making and stacking modules and with allowing the first and second fluids to flow.

Furthermore, in order to have a good compromise between heat exchange and head losses, the ridges and the troughs in the plates form a first angle $\beta$ with the flow direction of the two fluids. If the directions of the troughs and the ridges were to be parallel to the flow direction of the fluids, then their effects on head losses would be minimal, however they would give rise to little movement within the fluids. They would therefore not encourage turbulence, and consequently they would not encourage heat exchange between the fluids.

In contrast, if the directions of the troughs and the ridges were to be perpendicular to the flow direction of the fluids, they would generate a large amount of movement and thus a large amount of turbulence in the fluids, thereby enhancing exchanges of heat. In contrast, their effects on head losses would be large.

Consequently, in order to have a good compromise that enables acceptable levels of turbulence to be generated in the two fluids and consequently good heat exchange, while limiting head losses in the two fluids, the directions of the troughs and of the ridges are inclined relative to the flow direction of the two fluids by a first angle β that is acute. For example, this first angle β between the directions of the troughs or of the ridges and the flow direction of the two fluids lies in the range 30° to 60°.

In addition, in order to optimize the exchange of heat between the two fluids it may be advantageous for said first angle β to vary in the heat exchanger. By way of example, this first angle β may increase in the flow direction of the first fluid. By way of example, the variation of said first angle β may lie in the range 5° to 20° from the inlet pipe to the outlet pipe of the heat exchanger. Preferably, the variation of this first angle β is equal to 10° from the inlet pipe to the outlet pipe of the heat exchanger.

Likewise, a second angle θ between the directions of the troughs and of the ridges in two adjacent plates has effects on the turbulence in the flows of the two fluids and on the head losses of the fluids. In the same manner as above, and in order to obtain a good compromise between head losses and turbulence, and consequently good heat exchange, this second angle θ between the directions of the troughs and the ridges of two adjacent plates should be non-zero angle. This second direction θ between the directions of the troughs and the ridges of two adjacent plates preferably lies in the range 60° to 120° depending on the flow direction of the fluids.

In addition, the heat exchanger is obtained by stacking the modules. By way of example, the modules are fastened together by clamping or by welding. Preferably, these modules are fastened by brazing at the points of contact with the inlet and outlet chimneys. In addition, their spacing can be maintained by the combs situated in the third cavity.

Likewise, the walls of the casing may be fastened by clamping. Preferably, these walls are fastened together by brazing and a wall is also fastened to each extreme module respectively by brazing.

This fastening method guarantees sealing of the heat exchanger as well as its ability to withstand thermal and mechanical stresses to which it is subjected.

During use of the heat exchanger of the invention in a turboshaft engine of a rotary wing aircraft, the components of the heat exchanger are subjected to strong thermal and mechanical stresses, the first and second fluids possibly being temperatures that are high and very different, as well as pressures that are likewise high and different.

In addition, these stresses are accentuated when the aircraft performs numerous starts and stops in a short amount of time, e.g. two to four starts in one hour. In this event, the heat exchanger is repeatedly subjected to rapid rises in temperature and pressure, followed by drops in temperature and pressure, without a stabilization period. As a result, considerable thermal and mechanical stresses as well as a fatigue phenomenon are likely to give rise in particular to cracks in the plates of said heat exchanger, or also to cracking or even breaking in the welds.

In order to best withstand these stresses, the plates may be made from a material known by the name "Inconel®" and the brazing may be performed with Inconel® or some other metal that has a high nickel content, with a composition that is very close to that of Inconel®. That makes it possible to have a unit that deforms in uniform manner thermally. In addition, the walls of the casing are made of Inconel® and they are assembled by brazing with a metal that is identical or very close to that used for brazing the plates.

In addition, in order to ensure that the heat exchanger remains uniform in particular in terms of material and of thermal expansion, the combs, if any, may also be made of Inconel®.

However, other materials may also be used to make the plates, in particular depending on the stresses to which the heat exchanger and the plates are subjected.

However, the thermal conductivity of the Inconel® is low, much lower than that of a soft steel or of aluminum. As a result, it is not usually used in heat exchangers. Furthermore, shaping the Inconel® to the desired shapes can be complex.

In order to compensate for this low thermal conductivity and to provide the heat exchanger of the invention with good thermal efficiency, the thickness of the plates constituting the heat exchanger is small.

By using plates of a thickness lying in the range 0.1 millimeters (mm) to 0.25 mm for example, the heat exchanges between the two fluids take place almost directly, i.e. as if there were no plates between them. As a result, the heat efficiency of the exchanger is excellent despite the use of a material having low thermal conductivity.

The corrosion resistance of Inconel® is also very high, which is favorable to its use in a heat exchanger designed for an aircraft turboshaft engine. The exhaust gases are corrosive and may oxidize a material with poor corrosion resistance.

Inconel® is also very ductile. This characteristic thus makes it possible for the plates to withstand the differences in temperature and pressure of the fluids flowing on either side of the plates, without damaging said plates.

These differences in temperature and pressure between the cavities are also likely to give rise to cracking and breaking in the welds. The use of a braze as described above during brazing of the plates also makes it possible to avoid damage. The use of a braze that is close to the metal making up the plates makes it possible to limit the differential effects of deformation in the brazed zones between the plates and the braze, thus avoiding the appearance of cracking or breaking.

In addition, the plates may be assembled together by "hard" brazing, performed at between 900° C. to 1100° C. In order to withstand the temperatures of the fluids while the heat exchanger is in operation, the braze is an Inconel® alloy modified as a function of the brazing point, so as to lower its creep temperature, while the heat exchanger is being assembled.

Finally, the differences in pressure and temperature between the two fluids also stress the sealing between the two cavities of the heat exchanger. The sealing in the heat exchanger of the invention is provided by brazing between the plates. As mentioned above, the braze used during brazing makes it possible to guarantee that the brazed zones withstand these stresses, and consequently provide good sealing.

However, the small thickness of the Inconel® plates could be a problem as regards thermal stresses and mechanical stresses, in particular the pressure difference between the two fluids flowing in the first and second cavities. However, the shape and the assembly of the plates make it possible to withstand said stresses. For this purpose, the troughs and the ridges of the plates made of Inconel® are, preferably, sinusoidal undulations.

However, making these sinusoidal undulations is a delicate operation. Whatever the material used, its yield point may be exceeded, and cracks or cracking due to plate forming stresses may appear in certain zones of said plate. The use of Inconel® does not facilitate forming, since its mechanical characteristics are not favorable to such shaping.

In order to overcome these risks, the technique of electro-hydroforming may be used. This technique consists in plastically deforming, possibly in several passes, a part of small thickness, for example a plate, under the effect of a fluid under pressure placed in a strong electric field. Other techniques may also be used to shape the plates, such as hot forming or cold forming in several passes, possibly with intermediate anneals.

The heat exchanger of the invention may further comprise one or more additional characteristics.

In particular, when the first fluid enters the heat exchanger under great pressure, it may generate considerable thrust inside the heat exchanger. This considerable thrust generated by the static pressure of the first fluid is applied to the obstructed end of each inlet pipe and of each outlet pipe. This obstructed end of each inlet pipe and of each outlet pipe is generally obstructed by respective casing walls. Consequently, this considerable thrust may be transmitted to the extreme module that is fastened to each of the walls and, consequently, may give rise to large amounts of deformation of said extreme modules and possibly to damage thereof.

The heat exchanger of the invention may include a tie rod situated in each inlet pipe and in each outlet pipe so as to avoid transmitting said considerable thrust to the two extreme modules of the heat exchanger.

A first opening and a second opening are arranged respectively in two walls of the casing, at the ends of each inlet pipe. In addition, a third opening and a fourth opening are arranged respectively in two of the walls at the ends of each outlet pipe.

Each tie rod comprises a tubular portion, a fifth opening at a first end of the tie rod and a convex end wall at a second end of said tie rod. The first end of each tie rod is fastened to one of the walls of the casing at the first opening or the third opening and the second end of each tie rod is fastened to another of the walls of the casing at the second opening or the fourth opening. By way of example, each tie rod is fastened by welding and preferably by brazing to a wall of the casing firstly at a portion of the fifth opening and secondly at the convex end wall. This fastening of each tie rod by welding or by brazing thus ensures firstly the sealing of the heat exchanger and secondly the mechanical strength of said tie rod.

Consequently, the first fluid enters the inlet pipe via said tie rod and more precisely via the fifth opening. In addition, the tie rod includes a plurality of recesses on its tubular portion, these recesses being located facing the first cavities at the inlet chimneys of each plate. Thus, said recesses enable the first fluid to flow between the first cavities and firstly the inlet pipe, secondly the outlet pipe.

The tubular portion of the tie rod is of section equivalent to the section of each inlet and outlet pipe so as to be housed inside said pipe. Since the pipe is generally cylindrical, the tubular portion of the tie rod is also cylindrical in shape. However, the tubular portion of the tie rod is not fastened to any of the plates forming the modules of the heat exchanger.

When it enters the heat exchanger, the first fluid spreads out in each inlet pipe, then in the first cavities, and finally in each outlet pipe. Its static pressure thus acts mainly on the convex end wall of each tie rod. Due to its shape, each convex end wall makes it possible to distribute the pressure of the first fluid in substantially uniform manner and it is thus subjected to little deformation. In addition, axial thrust generated by the pressure of the first fluid is exerted mainly, or even exclusively, on the convex end wall of each tie rod and is thus taken up directly by each tie rod in traction. This axial thrust is thus transmitted to the walls on which the tie rods are fastened, without being transmitted to the modules of the heat exchanger.

Ideally, the convex end wall of the tie rod is hemispherical in shape so as to distribute the pressure of the first fluid evenly on said convex end wall. However, a hemispherical convex end wall may be detrimental in terms of bulkiness.

In order to limit said bulkiness, the convex end wall is preferably of flattened hemispherical shape that can be referred to as "almost spherical". Such an almost-spherical convex end wall thus makes it possible to reach a good compromise between distributing the pressure of the first fluid on said convex end wall and its bulkiness.

Naturally, other shapes can be used for the convex end wall, these shapes in particular being imposed by the material selected for making the convex end wall and any constraint involved with shaping it.

In addition, each tie rod does not generate additional significant head losses on the first fluid, the recesses being placed facing the first cavities and being sufficiently large and numerous. Therefore, the use of a tie rod in each inlet pipe and in each outlet pipe does not reduce the performance of the heat exchanger and improves its mechanical strength.

Each tie rod may also be broken down into a plurality of components so as to facilitate manufacture and/or assembly thereof on the walls of the casing. By way of example, such a tie rod comprises a tubular portion, a convex end wall, and a flange including the fifth opening. The flange is fastened to a wall of the casing at the first opening or the third opening while the convex end wall is fastened to another of the walls at the second opening or the fourth opening. This flange is of section equivalent to the tubular portion, this tubular portion being fastened firstly to said flange and secondly to a wall at the second opening or the fourth opening.

In addition, when the second fluid enters the heat exchanger at very high temperature, the temperature inside the heat exchanger increases considerably very quickly.

More particularly, a portion of each inlet pipe and of each outlet pipe is exposed directly to the flow of said second fluid, this "exposed" portion of each pipe thus heats up very quickly. However, another portion of each pipe is not directly exposed to this flow of the second fluid, this "non-exposed" portion of each pipe thus heats up much less quickly.

Consequently, considerable differential expansion between the exposed portion and the non-exposed portion of each pipe appears very quickly as soon as the second fluid enters the heat exchanger. This differential expansion may reach several millimeters and can generate considerable stresses on the places or modules and can accelerate fatigue, since the zones for fastening the plates to the inlet chimneys and outlet chimneys of said plates are particularly rigid. In particular, cracking may appear in the fastenings between two plates forming a module at the inlet and/or outlet chimneys of these plates. In addition, cracks may also appear on the plates near said inlet and/or outlet chimneys. This cracking and/or these cracks can then lead to damage to the plates and/or modules, such as leaks, or even breaking of the plates or of a module.

In order to limit the effects of this differential expansion, a flexible zone may be incorporated in the proximity of each inlet chimney and of each outlet chimney of the plates so as to absorb at least a portion of the deformation resulting from said differential expansion. In particular, the flexible zone enables two adjacent modules to deform independently of each other. The flexible zone also enables each inlet pipe and each outlet pipe to deform radially, with the exposed portion of each pipe expanding in a manner that is greater than the non-exposed portion, without introducing additional stresses at the plates and the modules.

Preferably, this flexible zone starts at the upper plane P2 and is situated between the upper plane P2 and the lower plane P1. This flexible zone may be formed by one or more waves incorporated in each plate around the inlet and outlet chimneys. This flexible zone is radial and is situated as close as possible to the inlet chimney and the outlet chimney. This flexible zone also serves as a ball joint enabling each pipe to deform more easily, and also to twist more easily, while limiting the stresses transmitted beyond said flexible zone.

By way of example, each wave of said flexible zone has the shape of a half-period of a sinusoidal wave. This flexible zone preferably has only one wave so as to limit bulkiness.

In addition, a protection screen may also be positioned between two modules so as to protect each inlet chimney and each outlet chimney from direct contact with the flow of the second fluid. Said protection screen also protects the connection between two modules at the inlet and outlet chimneys from direct contact with the flow of the second fluid.

In order to best protect the chimneys and the connection between the modules, said protection screen is situated between each intermediate plane P3 of the two adjacent plates of two adjacent modules, i.e. between the ridges of said two adjacent plates. The effect of the flow of the second fluid is thus reduced on the exposed portions of each inlet and outlet pipe, thus making the heating of each inlet and outlet pipe more uniform radially. As a result, said protection screen makes it possible to reduce differential expansion between the exposed portion and the non-exposed portion.

By way of example, the protection screen is a tube of circular section, each inlet chimney and each outlet chimney being cylindrical and of circular section. A protection screen is thus positioned around each inlet chimney and each outlet chimney and is concentric with each inlet or outlet chimney.

The function of the protection screens is to protect the exposed portion of each inlet chimney and each outlet chimney from the flow of the second fluid. As a result, each protection screen may also be constituted by a tube portion, e.g. by a half-tube. The half-tubes are thus positioned around the inlet chimneys and outlet chimneys, at the exposed portions of each inlet and outlet chimney, and concentrically with each inlet or outlet chimney.

The material of said protection screen is identical to that of the plates, as is its thickness. The height of said protection screen makes it possible to position it between two modules, with gap for accommodating firstly the expansion of said protection screen, which is subjected to the flow of the second fluid, and secondly the deformation and the expansion of the plates of each module.

In order to minimize the thermal effects of the flow of the second fluid on each inlet or outlet chimney, the use of a protection screen may be combined with the use of a flexible zone. In this event, the protection screen is preferably positioned outside the flexible zone, relative to the center of the inlet or outlet chimneys. The combined use of a flexible zone and of a protection screen makes it possible to reduce drastically the considerable thermal stresses to which the inlet and outlet pipes of a heat exchanger are generally subjected, in particular one fitted on a turboshaft engine, thereby greatly lengthening the lifetime of the heat exchanger.

Furthermore, each module, whatever the position of each module in the heat exchanger, is passed by the first fluid and must therefore withstand the pressure of said first fluid. When the pressure of the first fluid is considerable, it tends to inflate the module, or even to split it open. In the central portion of the module, the fastening points between the two plates constituting the module are sufficiently numerous to enable the modules to withstand said pressure.

However, in the vicinity of the inlet and outlet pipes, the number of fastening points is generally lower, since the directions of the troughs of the plates constituting said module intersect. Consequently, these fastening points can break under the effect of the pressure of the first fluid, leading to the module being damaged, and, as a result, leaking.

Therefore, in order to increase the number of fastening points between the two plates constituting said module and thereby reinforce said zone, a stiffening washer may be positioned between said two plates at the periphery of each inlet chimney and each outlet chimney. Said stiffening washer may be fastened to each of the plates, e.g. by welding and preferably by brazing at the troughs of the plates and possibly the peripheral zone. Said stiffening washer may be complete, i.e. it may cover 360°, so as to be fastened to the troughs situated around an inlet chimney or an outlet chimney and to the peripheral zone around said inlet or outlet chimney. Said stiffening washer may alternatively have the shape of a circular arc so as to be fastened only to the troughs situated around an inlet chimney or an outlet chimney.

Said stiffening washer considerably increases the contact and connection area between the two plates constituting a module. Said stiffening washer thus makes it possible to reinforce the ability of each module to withstand the pressure of the first fluid.

Advantageously, said stiffening washer also makes it possible to enable each module to tolerate potential breaking of one or more fastening points in the proximity of the inlet chimney and of the outlet chimney, thus increasing the lifetime of the heat exchanger of the invention.

Said stiffening washer is of small thickness. By way of example, the stiffening washer has a thickness equivalent to the plates, i.e. lying in the range 0.1 mm to 0.25 mm. Said stiffening washer is made of metal. Preferably, said stiffening washer is constituted by the same material as the plates.

In addition, in order to position said washer between two plates constituting a module without putting the other fastening points of the two plates at risk, the troughs have a locally reduced depth making it possible to position the stiffening washer between the two plates. Each trough of a plate of said module thus has a depth that is reduced by a value that is equal to at least half the thickness of the stiffening washer.

In addition, movable flaps can be positioned in the third cavity between the modules and at least one of the walls. In an open first position, these movable flaps enable the second fluid to flow mainly in the third cavity and in a closed second position they do not enable the second fluid to flow in said third cavity. In said closed second position, the second fluid thus flows in the second cavities.

By way of example, in the closed second position, the flaps occupy the full height of said third cavity. Consequently, in said third cavity, the second fluid encounters obstacles constituted by said flaps and is guided mainly towards a zone in which it can flow, i.e. the second cavities of the heat exchanger.

Furthermore, the invention also provides a gas turbine fitted with such a heat exchanger. The first fluid is then constituted by the admission air for the combustion chamber of the turbine, coming from a compressor, and the second fluid is constituted by the exhaust gases leaving the turbine.

The gas turbine has at least one cold volute and at least one hot volute. The cold volute enables the admission air to flow from the compressor of the turbine to the inlet pipe of the heat exchanger, while the hot volute allows the admission air to flow from the outlet pipe of the heat exchanger to the combustion chamber of the turbine.

The gas turbine also has at least one intermediate nozzle and an outlet nozzle. The exhaust gas leaves the turbine via the intermediate nozzle and is directed to the inlet of the heat exchanger, and after the exhaust gas has left the outlet of the heat exchanger the outlet nozzle directs it away from the turbine.

The heat exchanger may be installed in line with the turbine or beside the turbine. For the in-line case, the exhaust gas is directed directly to the heat exchanger after leaving the turbine, but the volume of such a gas turbine and heat exchanger assembly is very large.

When side by side, the exhaust gas needs to be directed towards the heat exchanger located beside the gas turbine. For that purpose, the intermediate nozzle has a bend of a shape appropriate to direct the exhaust gas while minimizing head losses. The assembly of the gas turbine and the heat exchanger then has a volume that is more compact than in the in-line configuration, and it may for example be incorporated in an aircraft.

In order to withstand thermal and mechanical stresses while providing the sealing necessary for good operation of the heat exchanger, metal bellows are arranged at the junction between the heat exchanger and the various elements of the gas turbine.

Since the heat exchanger is in a high temperature environment, all of the components of the heat exchanger and of the engine are subjected to expansion. The bellows serve to mitigate such expansions. The environment of the heat exchanger is also subjected to a large amount of vibration. Once more, the bellows serve to absorb such vibration.

The bellows are to be found in particular at the outlet nozzles from the turbine and at the outlet from the heat exchanger for the exhaust gas, and also at the cold and hot volutes that are connected respectively to the inlet and outlet pipes for admission air. The bellows are preferably made of Inconel®.

Finally, the invention also provides a rotary wing aircraft including at least one gas turbine provided with a heat exchanger of the invention.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIG. 1 shows a heat exchanger plate;
FIG. 2 shows a heat exchanger module;
FIG. 3 shows how plates are stacked in a module;
FIGS. 4 to 9 show heat exchangers of the invention;
FIGS. 12 and 13 show a turboshaft engine having a heat exchanger.

DETAILED DESCRIPTION OF THE INVENTION

Figure 10:
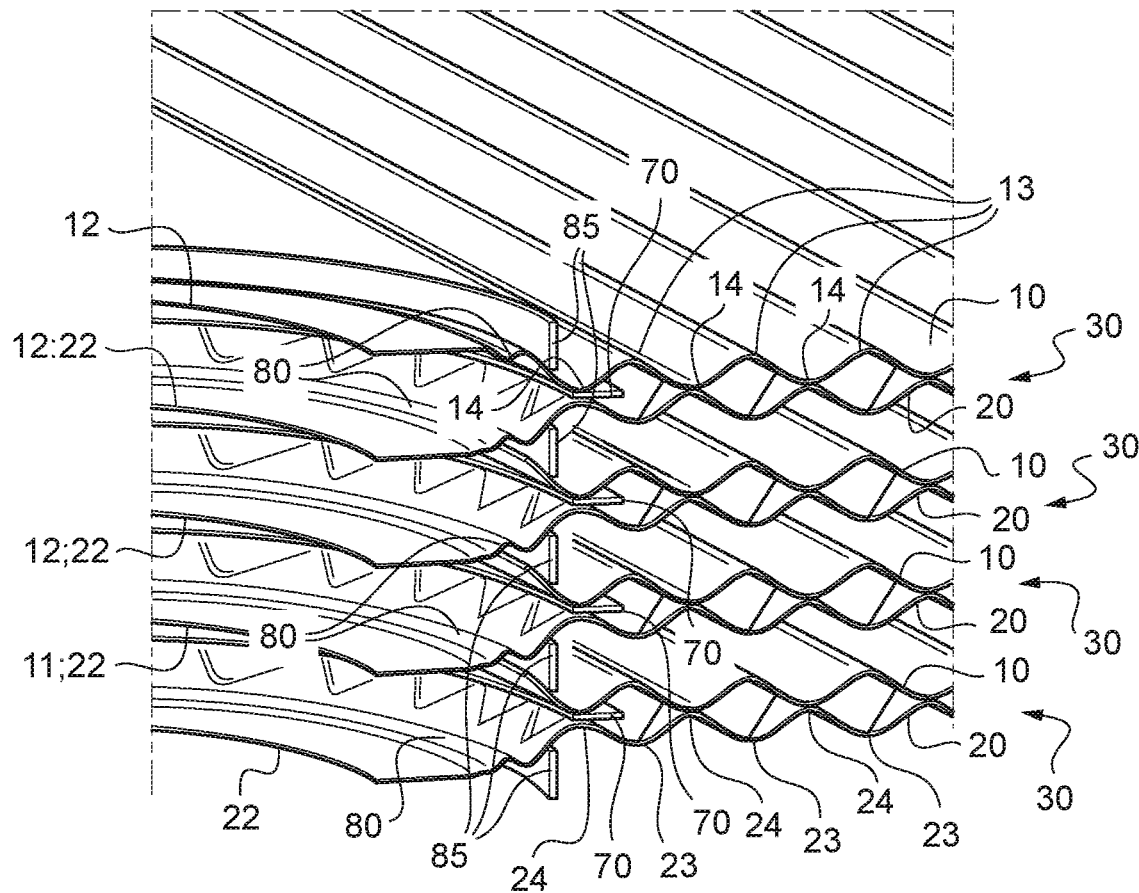
FIG. 10 is a detailed view of a heat exchanger.

Elements present in more than one of the figures are given the same references in each of them.

FIG. 1 shows a plate 10 having a plane peripheral zone 19 with a crenellated inner zone having sinusoidal undulations with ridges 13 and troughs 14 that are parallel to one another. An inlet chimney 11 and an outlet chimney 12, located in two opposite corners of the plate 10 project from the peripheral zone 19 to an upper plane P2, as can be seen in FIG. 3.

The peripheral zone 19 forms a lower plane P1 in which the troughs 14 are situated. The ridge undulations 13 are situated in an intermediate plane P3, the intermediate plane P3 being positioned between the lower and upper planes P1 and P2 and being parallel to these planes P1 and P2.

As shown in FIG. 2, a module 30 is formed by assembling the plate 10 with a plate 20. The ridges 13 and the troughs 14 of the first plate 10 co-operate with the ridges 23 and the troughs 24 of the second plate 20 to form a second angle θ lying in the range 60° to 120°.

In FIG. 3, there can be seen the points of contact between the plates 10 and 20 and the way the modules 30 are stacked. The plates 10 and 20 make contact via the troughs 14, 24 and their peripheral zones 19, 29. They are fastened together by brazing at these points of contact so as to form the modules 30.

The modules 30 are stacked on one another to form a heat exchanger 50 of the invention. They are in contact via the inlet chimneys 11, 21 and the outlet chimneys 12, 22. The modules 30 are assembled together by brazing at these points of contact.

The inlet chimneys 11, 21 of each plate 10, 20 are thus connected together and form an inlet pipe 53 of the heat exchanger 50. Likewise, the outlet chimneys 12, 22 form an outlet pipe 54.

The ridges 13 of the plates 10, 20 of two adjacent modules 30 are spaced apart by a non-zero first distance d1. A second distance d2 corresponds to the distance between the tops of the ridges 13 and the bottoms of the troughs 14 of each plate 10, 20, i.e. the distance between the lower plane P1 and the intermediate plane P3 of a plate 10, 20. The total height d3 of a plate 10, 20 is the distance between the lower plane P1 and the upper plane P2, the inlet chimneys 11, 21 and the outlet chimneys 12, 22 projecting upwards until they reach said upper plane P2. These sinusoidal undulations have the same period P.

By way of example, the first distance d1 lies in the range 2 mm to 3 mm, while the second distance d2 lies in the range 3 mm to 4 mm. By way of example, the period P is equal to 9 mm. The thickness of the plates 10, 20 lies in the range 0.1 mm to 0.25 mm, and these plates 10, 20 may be made of Inconel®.

FIGS. 4 to 9 show heat exchangers 50 constituted by stacking the modules 30. This stack is placed inside a casing 60, having walls 65, in which there are arranged an inlet 55 and an outlet 56 of the heat exchanger 50.

The space between two plates 10 and 20 of a module 30 form a first cavity. The first cavities 51 are connected together by the inlet and outlet pipes 53 and 54. The space between two adjacent modules 30 forms a second cavity 52, as does the space between an extreme module 30 and a wall 65. A third cavity 58 is constituted by the space situated between the peripheral zones 19 of the modules 30 and the walls 65 of the casing 60. The second cavities 52 are connected together in particular via the inlet 55 and the outlet 56 of the heat exchanger 50, and also via the third cavity 58.

A first fluid enters into the heat exchanger 50 via the inlet pipe 53 and leaves the heat exchanger 50 via the outlet pipe 54, so it flows in the first cavities 51. A second fluid enters into the heat exchanger 50 via the inlet 55 and leaves the heat exchanger 50 via the outlet 56, so it flows in the second cavities 52 parallel to and preferably in the opposite direction to the first fluid. The flow of the second fluid is limited by the walls 65 of the casing 60. The second fluid may also flow in the third cavity 58.

Thus, the first and second fluids pass through the heat exchanger 50 while exchanging heat between each other. In addition, the plates 10, 20 are of thickness that is sufficiently small to enable heat exchange to take place between the first and second fluids independently of the capacity of the plates 10 and 20 for conducting heat.

In the heat exchanger 50, the directions of the troughs 14, 24 and of the ridges 13, 23 of each plate 10, 20 form a first angle β with the flow direction of the fluids, as shown in FIG. 2. This first angle β is generally constant along a single plate 10, 20 and identical for each plate 10, 20 of the exchanger 50. Consequently, the second angle θ between the troughs 14, 24 and the ridges 13, 23 of two adjacent plates 10, 20 is also generally constant and not zero. The plates 10, 20 are assembled together in such a manner that the directions of their troughs 14, 24 and of the ridges 13, 23 intersect so as to obtain a good compromise between heat exchange and head losses between the two fluids.

FIG. 4 shows combs 59 present in the third cavity 58 between the modules 30 and the walls 65 of the casing 60. These combs 59 serve to create head losses in the second fluid and to direct it towards the second cavities 52.

These combs 59 occupy the entire height between the walls 65 of the casing 60 and the modules 30 so as to constitute obstacles for the second fluid. The particular shape of these combs 59 also makes it possible to guarantee that the spacing between the modules 30 at the periphery of the modules 30.

Furthermore, the first fluid and the second fluid may have considerable differences in temperature and pressure. In particular, this heat exchanger 50 may be fitted to a gas turbine 100, e.g. driving a rotary wing aircraft, with such a gas turbine 100 being shown in FIGS. 12 and 13. The first fluid may then be constituted by the air admitted into a combustion chamber 90 of the gas turbine 100 and the second fluid may be constituted by the exhaust gas leaving the combustion chamber 90 via an intermediate nozzle 70. The admission air flows through the modules 30 at high pressure, whereas the exhaust gas enters the heat exchanger 50 at very high temperature.

Each module 30 may thus be subjected to large amounts of deformation due firstly to the considerable pressure of the admission air and secondly to thermal expansion resulting from the considerable differences in temperature between said admission air and the exhaust gas.

However, since the modules 30 make contact via the inlet chimneys 11, 21 and outlet chimneys 12, 22 as well as possibly the combs 59 present between the walls 65 and the modules 30, the mechanical and thermal behavior of each module 30 are independent from the other modules 30 of the heat exchanger 50.

As a result, the deformation of a module 30, which takes place essentially in the troughs 14, 24 and in the ridges 13, 23, does not propagate to the other modules 30 of the heat exchanger 50. In addition, the deformation of each module 30 does not spread to the walls 65 of the casing 60.

Thus, each module 30 can deform freely without generating stress on the adjacent modules 30 or naturally on the casing 60, thus making it possible to improve the lifetime of each module 30 in terms of heat and pressure cycles and, consequently, the lifetime of the heat exchanger 50.

Furthermore, a heat exchanger 50 may include a tie rod 40 in each inlet pipe 53 and in each outlet pipe 54, such a heat exchanger 50 being shown in FIGS. 5 to 7.

Each tie rod 40 comprises a tubular portion 44 provided with a plurality of recesses 46, a fifth opening 43 at a first end 41 of the tie rod 40 and a convex end wall 45 at a second end 42 of the tie rod 40.

Each tie rod 40 may be a single piece, i.e. made up of a single part as shown in FIG. 6. Each tie rod 40 is thus fastened to two walls 65 of the casing 60. The first end 41 of a first tie rod 40 is fastened at the first opening 61 of a first wall 65 and the second end 42 of the tie rod 40 is fastened at the second opening 62 of a second wall 65 opposite said first wall 65. In addition, the first end 41 of a second tie rod 40 is fastened to the third opening 66 in the second wall 65 and the second end of said second tie rod 40 is fastened to the fourth opening 62 in the opposite first wall 65. In the heat exchanger 50 shown in all of the figures, the first fluid enters the inlet pipe 53 on a face of the heat exchanger 50 that is opposite where said first fluid exits through the outlet pipe 54.

Each tie rod 40 may also be made up of a plurality of parts as shown in FIG. 7, in particular so as to facilitate manufacture and/or assembly thereof on the walls 65 of the casing 60. Each tie rod thus comprises three components: a tubular portion 44 provided with a plurality of recesses 46; a convex end wall 45; and a flange 47 including the fifth opening 43. The flange 47 is fastened to a wall 65 at the first opening 61 or the third opening 66 depending on whether the tie rod 40 is situated in the inlet pipe 53 or the outlet pipe 54. The convex end wall 45 is fastened to another wall 65 at the second opening 62 or the fourth opening 67. The flange 47 is a cylindrical section that is equivalent to the tubular portion 44, said tubular portion 44 being fastened firstly to the flange 47 and secondly to a wall 65 at the second opening 62 or the fourth opening 66, close to the convex end wall 45.

Each tie rod 40 or indeed each component 44, 45, 47 of a tie rod 40 made up of a plurality of parts may be fastened by welding and preferably by brazing to the walls 65, thus providing firstly sealing between the inside and the outside of the heat exchanger 50 and secondly mechanical strength of said heat exchanger 50. The walls 65 may include dropped edges at the first and second openings 61, 62 so as to facilitate assembly. However, the tubular portion 44 of the tie rod 40 is not fastened to any plate 10, 20 forming the modules 30 of the heat exchanger 50.

As a result, the mechanical stresses to which said tie rod 40 is subjected, essentially under the effect of the static pressure of the first fluid flowing in the inlet and outlet pipes 53, 54 and, consequently, in the tie rods 40, are not transmitted to the modules 30, but are transmitted directly to the walls 65 of the casing 60. In addition, the recesses 46 situated facing the first cavities 51 make it possible for the first fluid to flow between the inlet and outlet pipes 53, 54 and the first cavities 51.

The convex end wall 45 of the tie rod has the shape of a flattened hemisphere so as to limit its bulkiness.

Figure 11:
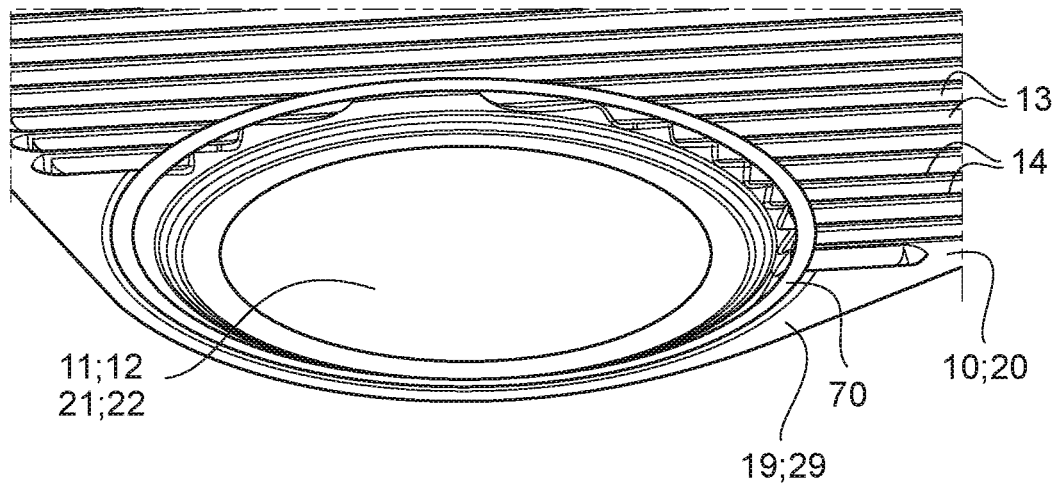
FIG. 11 shows a plate provided with washers for providing stiffening.

In addition, the heat exchanger 50 shown in FIGS. 6 and 7 also comprises a stiffening washer 70 so as to enable each module 30 of the heat exchanger 50 to withstand the pressure of the first fluid. This stiffening washer 70 is fastened to the inside of each module 30, between two plates 10, 20 e.g. by welding and preferably by brazing. Said stiffening washer 70 is fastened to the troughs of said plates 10, 20 about an inlet chimney 11, 21 and an outlet chimney 12, 22 and close to said chimneys 11, 12, 21, 22 and at the peripheral zone 19, 29 of said plates 10, 20, as shown in FIG. 11. Said stiffening washer 70 may also be circularly arcuate in shape and be fastened only to the troughs 14, 24 situated about an inlet chimney 11, 21 or an outlet chimney 12, 22 so as to follow the circular shape of said chimneys 11, 12, 21, 22.

Said stiffening washer 70 increases the contact and connection area between the two plates 10, 20 constituting a module and thus reinforces the resistance of each module 30 to the pressure of the first fluid.

Said stiffening washer is of small thickness, equivalent to that of the plates 10, 20. Said stiffening washer 70 is constituted by the same material as the plates 10, 20.

In addition, as shown in FIG. 10, the troughs 14, 24 have locally smaller thickness making it possible to position the stiffening washer 70 between the two plates 10, 20 while enabling other fastening points to be made between said two plates 10, 20.

The heat exchanger 50 shown in FIGS. 6 and 7 also comprises flexible zones 80 that are incorporated close to and around each inlet chimney 11, 21 and each outlet chimney 12, 22 of the plates 10, 20 on each of the plates 10, 20. Said flexible zone 80 starts on the upper plane P2 and is situated between the upper plane P2 and the lower plane P1 of each plate 10, 20. Said flexible zone 80 comprises a single circular wave as shown in FIG. 10 positioned around the outlet chimneys 12, 22.

Said wave of the flexible zone 80 has the shape of one half-period of a sinusoidal wave. Said wave of the flexible zone is of height lying in the range 1 mm to 2 mm and of width lying in the range 2 mm to 3 mm.

These flexible zones 80 enable two adjacent modules 30 to deform independently of each other, e.g. by expansion. These flexible zones 80 also enable each inlet pipe 53 and each outlet pipe 54 to deform radially without introducing considerable mechanical stress on the plates 10, 20 and on the modules 30.

The heat exchanger 50 shown in FIGS. 6 and 7 also includes protection screens 85. One protection screen 85 is positioned between each pair of modules 30, around inlet chimneys 11, 21 and outlet chimneys 12, 22, between the ridges 14, 24 of the two adjacent plates 10, 20 of two adjacent modules 30. A protection screen 85 is also positioned between an extreme module 30 and a wall 65 of the casing 60, around the input chimneys 11, 21 and output chimneys 12, 22, between said wall 65 and the ridges 14, 24 of the plate 10, 20 of said module 30.

These protection screens 85 are tubes of circular section positioned respectively concentrically around each of the outlet chimneys 12, 22. This protection screen 85 is made of the same material as the plates 10, 20 and is of the same thickness. By way of example, the height of said protection screen 85 lies in the range 5 mm to 10 mm.

The protection screens 85 thus protect the inlet chimneys 11, 21 and the outlet chimneys 12, 22 as well as the connection between two adjacent modules 30 from a direct contact with the flow of the second fluid entering the heat exchanger 50 via the inlet 55.

Consequently, said protection screen 85 may also be constituted by a half-tube so as to protect the exposed portion of each inlet chimney 11, 21 and of each outlet chimney 12, 22 of said flow of second fluid flowing in the heat exchanger 50.

In FIGS. 8 and 9, the heat exchanger 50 includes movable flaps 57 that are positioned in the third cavity 58 between the modules 30 and a wall 65 of the casing 60, at the periphery of said modules 30. Combs 59 are present between another wall 65 of the casing 60, at the opposite end of said flaps 57, so as to guide the second fluid between the modules 30.

In FIG. 8, the second fluid cannot pass through the third cavity 58, which is closed by the flaps 57 and the combs 59, said flaps 57 and said combs 59 guide the second fluid between the modules 30, i.e. the second cavities 52.

In FIG. 9, the flaps 57 are open and the third cavity 58 is accessible to the second fluid. Said third cavity 58 is free, i.e. free from obstacles. As a result, said third cavity 58 creates only very little head loss on the second fluid. The flow in the third cavity 58 is thus simpler for the second fluid than for the flow between the modules 30, which generates head loss. Consequently, the second fluid passes naturally and essentially via the third cavity 58 instead of passing between the modules 30.

Consequently, when the flaps 57 are open, the second fluid passes through the heat exchanger 50, while passing essentially via the third cavity 58 where it is subjected to very little head loss.

This operation is useful when such a heat exchanger 50 is applied to a gas turbine 100, as shown in FIGS. 12 and 13.

In this event, the first fluid is constituted by the air admitted into a combustion chamber 90 of the gas turbine 100 and the second fluid may be constituted by the exhaust gas leaving the combustion chamber 90 via an intermediate nozzle 70.

While the exhaust gas is passing through the second cavities 52 of the heat exchanger 50, it heats the admission air that also passes through the heat exchanger 50 via the first cavities 51. This serves to reduce the fuel consumption of the gas turbine 100 since the admission air is heated prior to being injected into the combustion chamber 90. However, the exhaust gas may be subjected to head losses on passing through the second cavities 52 prior to leaving the heat exchanger via an outlet nozzle 72. These head losses have a direct repercussion on the performance of the gas turbine 100 since its power is reduced.

In order to avoid such a reduction of power, it is necessary to reduce, and if possible to eliminate, head losses in the exhaust gas. For this purpose, the exhaust gas passes through the third cavity 58 of the heat exchanger 50. Under such circumstances, the admission air is not heated and fuel consumption is therefore not reduced. However, since the exhaust gas is subjected to very little head loss, the gas turbine 100 then operates at maximum power.

The switching between the two operating modes, i.e. between reduced consumption at reduced power and normal consumption at full power, is obtained by causing the flaps 57 to move from the closed position to the open position using moving means. These moving means are incorporated into the heat exchanger or into the gas turbine.

FIG. 13 shows a plan view of the gas turbine 100. A cold volute 73 enables the admission air to flow from the compressor of the gas turbine 100 to the inlet pipe 53. A hot volute 74 allows the admission air to flow from the outlet pipe 54 to the combustion chamber 90 of the gas turbine 100.

It can also be seen in FIG. 10 that the heat exchanger 50 is positioned between the nozzles 70 and 72. In order to withstand thermal and mechanical stresses, and in particular in order to absorb expansions and vibration, while still providing the sealing needed for proper operation of the heat exchanger 50, metal bellows 75 are arranged at the junctions between the heat exchanger 50 and the various elements of the gas turbine 100. These bellows 75 are to be found in particular in association with the intermediate nozzle 70 and the outlet nozzle 72. Such bellows 75 may also be used with the inlet and outlet pipes 53 and 54 for the admission air, in association with the cold and hot volutes 73 and 74.

Naturally, the present invention may be subjected to numerous variations as to its implementation. Although several embodiments are described, it should readily be understood that it is not conceivable to identify exhaustively all possible embodiments. It is naturally possible to envisage replacing any of the means described by equivalent means without going beyond the ambit of the present invention. In particular, the shapes of the troughs and the ridges in the plates could be different.

In particular, the troughs 14, 24 and the ridges 13, 23 of the plates 10, 20 that are of sinusoidal wave shape in all of the figures could be of other shapes, such as of rectangular wave shape or of trapezoidal wave shape. Likewise, these troughs 14, 24 and the ridges 13, 23 of the plates 10, 20 that extend in a single straight direction in all of the figures could extend in a plurality of intersecting directions over the plate as a whole. For example, the troughs 14, 24 and the ridges 13, 23 could follow sinuous paths of zigzag or squarewave shapes.

The invention claimed is:

1. A plate heat exchanger comprising:
   a plurality of modules, each module of the plurality of modules being formed by two metal plates, each of the two metal plates having a peripheral zone, at least one inlet chimney, at least one outlet chimney, and a crenellated inner zone comprising ridges and troughs, the troughs and the peripheral zone being situated in a lower plane (P1), the at least one inlet chimney and the at least one outlet chimney projecting from the peripheral zone to an upper plane (P2) parallel to the lower plane (P1), the ridges being situated in an intermediate plane (P3) parallel to the lower and upper planes (P1, P2) and positioned between the lower and upper panes (P1, P2), the two metal plates constituting one module of the plurality of modules being in contact firstly via each of the peripheral zones of the two metal plates and secondly via points of contact of the troughs, at least one inlet pipe being formed by the at least one inlet chimney of each of the two metal plates, and at least one outlet pipe being formed by the at least one outlet chimney of each of the two metal plates, the troughs and the ridges of each of the two metal plates forming directions having a first angle β with a flow direction of fluids flowing in the plate heat exchanger, and the directions of the troughs and of the ridges of one of the two metal plates forming with the directions of another of the two metal plates a non-zero second angle θ, the plurality of modules being stacked in such a manner that two adjacent modules of the plurality of modules make contact via the at least one inlet and outlet chimneys, with a first non-zero distance separating the ridges of two adjacent plates from the two adjacent modules, wherein the plurality of modules form extreme modules;
   a casing having walls within which the plurality of modules are received, an inlet and an outlet of the plate heat exchanger being arranged in the casing;
   a first cavity constituted by an inside space of each module of the plurality of modules, a first fluid of the fluids being capable of flowing in the first cavities between each inlet pipe of the at least one inlet pipe and each outlet pipe of the at least one outlet pipe;
   a second cavity constituted by a first space situated between the two adjacent modules and by a second space between each of the extreme modules and a wall of the walls of the casing, a second fluid of the fluids being capable of flowing in the second cavity between as the inlet and the outlet of the plate heat exchanger; and
   a third cavity constituted by a third space situated between the peripheral zones of the plurality of modules and the walls;
   the plate heat exchanger having a zone that is incorporated around each of the at least one inlet chimney or each of the at least one outlet chimney, the zone comprising at least one radial wave starting on the upper plane (P2) and lying between the upper and lower planes (P2, P1);
   a stiffening washer is positioned in each module of the plurality of modules at a periphery of each of the at least one inlet pipe and each of the at least one outlet pipe, the stiffening washer being fastened to the troughs of the two metal plates constituting the respective module; and
   wherein the troughs have a region with reduced heights in comparison to adjacent troughs of the same plate to position the stiffening washer between the two metal plates constituting the respective module.

2. The plate heat exchanger according to claim 1, wherein a first opening and a second opening are respectively arranged in two walls of the walls for each inlet pipe of the at least one inlet pipe, a third opening and a fourth opening being respectively arranged in the two of the walls for each outlet pipe of the at least one output pipe, a tie rod is situated in each inlet pipe of the at least one inlet pipe and in each outlet pipe of the at least one outlet pipe, the tie rod comprising a tubular portion, a fifth opening at a first end of the tie rod and a convex end wall at a second end of the tie rod, the first end of each tie rod being fastened to one of the two walls at the first opening or at the third opening, and the second end of each tie rod being fastened to another of the two walls at the second opening or at the fourth opening, the tie rod comprising a plurality of recesses on the tubular portion so as to enable the first fluid to flow between firstly the inlet pipe or the outlet pipe and secondly the first cavities.

3. The plate heat exchanger according to claim 2, wherein the tie rod comprises at least three components, a tubular portion, a flange including a fifth opening and a convex end wall, the flange being fastened to one of the two walls at the first opening or the third opening, and the convex end wall being fastened to another of the two walls at the second opening or the fourth opening, the tubular portion being fastened to the another of the two walls at the second opening or the fourth opening, and to the flange, the tubular portion comprising several recesses so as to enable the first fluid to flow between firstly the at least one inlet pipe or the at least one outlet pipe and secondly the first cavities.

4. The plate heat exchanger according to claim 2, wherein the convex end wall of each tie rod is of almost spherical shape.

5. The plate heat exchanger according to claim 1, wherein a protection screen is positioned between the adjacent plates of the two adjacent modules of the plurality of modules around each of the at least one inlet chimney and/or each of the at least one outlet chimney.

6. The plate heat exchanger according to claim 5, wherein the protection screen is situated between each of the lower planes (P1) of the two adjacent plates of the two adjacent modules.

7. The plate heat exchanger according to claim 5, wherein the protection screen is a tube of circular section.

8. The plate heat exchanger according to claim 5, wherein the protection screen is a member with a semi-circular section.

9. A gas turbine, including the plate heat exchanger according to claim 1.

10. The gas turbine according to claim 9, the first fluid being compressed aft feeding a combustion chamber of the gas turbine and the second fluid being constituted by exhaust gas leaving the combustion chamber, the gas turbine having at least one cold volute enabling the compressed air to flow from a compressor of the gas turbine to the inlet pipe, at least one hot volute enabling the compressed air to flow from the outlet pipe to the combustion chamber, at least one intermediate nozzle enabling the exhaust gas from the combustion chamber to be directed to the inlet of the plate heat exchanger, and at least one outlet nozzle enabling the exhaust gas to be directed after exiting via the outlet of the plate heat exchanger.

11. A rotary wing aircraft, wherein the rotary wing aircraft includes at least one of the gas turbine according to claim 9.

12. The plate heat exchanger according to claim 1, wherein the first non-zero distance separating the ridges of the two adjacent plates of the two adjacent modules defines at least a portion of the first space such that the second fluid is capable of flowing between the ridges of the two adjacent plates of the two adjacent modules.

13. The plate heat exchanger according to claim 1, wherein each radial wave has a shape of a half-period of a sinusoidal wave, and wherein each radial wave is the only wave around each of the at least one inlet and outlet chimneys.

14. A plate heat exchanger comprising:
a plurality of modules, each module of the plurality of modules being formed by two metal plates, each of the two metal plates having a peripheral zone, at least one inlet chimney, at least one outlet chimney, and a crenellated inner zone comprising ridges and troughs, the troughs and the peripheral zone being situated in a lower plane (P1), the at least one inlet chimney and the at least one outlet chimney projecting from the peripheral zone to an upper plane (P2) parallel to the lower plane (P1), the ridges being situated in an intermediate plane (P3) parallel to the lower and upper planes (P1, P2) and positioned between the lower and upper panes (P1, P2), the two metal plates constituting one module of the plurality of modules being in contact firstly via each of the peripheral zones of the two metal plates and secondly via points of contact of the troughs, at least one inlet pipe being formed by the at least one inlet chimney of each of the two metal plates, and at least one outlet pipe being formed by the at least one outlet chimney of each of the two metal plates, the troughs and the ridges of each of the two metal plates forming directions having a first angle $\beta$ with a flow direction of fluids flowing in the plate heat exchanger, and the directions of the troughs and of the ridges of one of the two metal plates forming with the direction of another of the two metal plates a non-zero second angle $\theta$, the plurality of modules being stacked in such a manner that two adjacent modules of the plurality of modules make contact via the at least one inlet and outlet chimneys, with a first non-zero distance separating the ridges of two adjacent plates from the two adjacent modules, wherein the plurality of modules form extreme modules;

a casing having walls within which the plurality of modules are received, an inlet and an outlet of the plate heat exchanger being arranged in the casing;

a first cavity constituted by an inside space of each module of the plurality of modules, a first fluid of the fluids being capable of flowing in the first cavities between each inlet pipe of the at least one inlet pipe and each outlet pipe of the at least one outlet pipe;

a second cavity constituted by a first space situated between the two adjacent modules and by a second space between each of the extreme modules and a wall of the walls of the casing, a second fluid of the fluids being capable of flowing in the second cavity between as the inlet and the outlet of the plate heat exchanger; and a third cavity constituted by a third space situated between the peripheral zones of the plurality of modules and the walls;

the plate heat exchanger having a zone that is incorporated around each of the at least one inlet chimney or each of the at least one outlet chimney, the zone comprising at least one radial wave starting on the upper plane (P2) and lying between the upper and lower planes (P2, P1); and wherein the troughs of each plate of the two metal plates have a region with reduced heights in comparison to adjacent troughs of the same plate to position a stiffening washer between the two metal plates constituting the respective module, the regions with reduced heights extending about a periphery of each of the at least one inlet pipe and each of the at least one outlet pipe of the two metal plates.

15. The plate heat exchanger according to claim 14, wherein the stiffening washer is positioned in each module of the plurality of modules at the periphery of each of the at least one inlet pipe and each of the at least one outlet pipe and fastened to the regions with reduced heights of the two metal plates constituting the module.

16. A plate heat exchanger comprising:
a plurality of modules, wherein each module of the plurality of modules comprises first and second metal plates, each of the first and second metal plates having a peripheral zone, an inlet chimney, an outlet chimney, and a crenellated inner zone comprising ridges and troughs, wherein for each of the first and second plates for each of the plurality of modules, the troughs and the peripheral zone are situated in a lower plane (P1), and the inlet chimney and the outlet chimney project from the peripheral zone to an upper plane (P2) parallel to the lower plane (P1), and the ridges are situated in an intermediate plane (P3) parallel to the lower and upper planes (P1, P2) and positioned between the lower and upper planes (P1, P2), wherein each of the first and second plates defines a radial wave immediately adjacent to and surrounding each of the respective inlet and outlet chimneys, each of the radial waves starting on the upper plane (P2) and lying between the upper and lower planes (P2, P1) of the respective plate, wherein the plurality of modules are stacked such that adjacent modules of the plurality of modules are in contact with one another via the inlet and outlet chimneys, and wherein the ridges of adjacent plates of the adjacent modules are separated by a first non-zero distance; and a casing defining a wall within which the plurality of modules are received, the casing defining an inlet and an outlet of the plate heat exchanger;

wherein the first and second plates of each module of the plurality of modules are in contact via the respective peripheral zones and via respective points of contact of the troughs;

wherein the inlet chimneys of the first and second metal plates of each module of the plurality of modules cooperate to form an inlet pipe;

wherein the outlet chimneys of the first and second metal plates of each module of the plurality of modules cooperate to form an outlet pipe;

wherein the troughs and the ridges of each of the first and second metal plates form directions having a first angle β with a flow direction of fluids flowing in the plate heat exchanger;

wherein the directions of the troughs and of the ridges of the first plate form a non-zero second angle θ with the directions of the second plate;

wherein a first cavity is defined by an inside space of each module of the plurality of modules, a first fluid of the fluids configured to flow in the first cavities between the inlet pipe and the outlet pipe of the respective module;

wherein a second cavity is defined by a first space and a second space, the first space defined between the adjacent modules of the plurality of modules and including the first non-zero distance between the adjacent modules, the second space defined between end modules of the plurality of modules and the wall of the casing, wherein a second fluid of the fluids is configured to flow in the second cavity between the inlet and the outlet of the plate heat exchanger;

wherein a third cavity is defined by a third space situated between the peripheral zones of the plurality of modules and the wall of the casing; and wherein the troughs of each of the first and second metal plates have a region with reduced heights in comparison to adjacent troughs of the same plate to position a stiffening washer between the first and second metal plates, the regions with reduced heights extending about a periphery of each of the inlet pipes and each of the outlet pipes of the first and second metal plates.

17. The plate heat exchanger according to claim 16, wherein each of the radial waves has a shape of a half-period of a sinusoidal wave and is the only wave around each of the at least one inlet and outlet chimneys;

wherein each of the radial waves is configured to enable one of the plurality of modules to deform independently of an adjacent module of the plurality of modules; and wherein each of the radial waves is configured to enable the respective inlet and outlet pipes to deform radially, with an exposed portion of each of the inlet and outlet pipes expanding in a manner that is greater than a non-exposed portion thereof.

* * * * *